United States Patent
Dzhragatspanyan et al.

[11] Patent Number: 6,068,779
[45] Date of Patent: *May 30, 2000

[54] ENHANCED LIQUID MIXTURE SEPARATION SYSTEM

[75] Inventors: Misak Dzhragatspanyan, North Hollywood; William A. Greene, Gardena, both of Calif.

[73] Assignee: Spintek Systems, Inc., Huntington Beach, Calif.

[ * ] Notice: This patent is subject to a terminal disclaimer.

[21] Appl. No.: 09/055,871

[22] Filed: Apr. 6, 1998

Related U.S. Application Data

[63] Continuation-in-part of application No. 08/790,373, Jan. 28, 1997
[60] Provisional application No. 60/010,733, Jan. 29, 1996.
[51] Int. Cl.[7] ................................................. B01D 17/02
[52] U.S. Cl. ......................... 210/799; 210/804; 210/499; 210/540; 210/DIG. 5
[58] Field of Search .................................. 210/799, 800, 210/804, 258, 259, 299, 335, 411, 416.1, 489, 499, 532.1, 538, 540, DIG. 5

[56] References Cited

U.S. PATENT DOCUMENTS

| | | | |
|---|---|---|---|
| 2,458,139 | 1/1949 | Boucher | 210/499 |
| 2,651,414 | 9/1953 | Lawson | 210/DIG. 5 |
| 3,016,345 | 1/1962 | Price | 210/DIG. 5 |
| 3,231,091 | 1/1966 | Kingsbury et al. | 210/DIG. 5 |
| 3,426,910 | 2/1969 | Winzen | 210/499 |
| 3,747,770 | 7/1973 | Zentis | 210/499 |
| 3,876,544 | 4/1975 | Fowler | 210/489 |
| 3,878,094 | 4/1975 | Conley et al. | 210/DIG. 5 |
| 4,257,895 | 3/1981 | Murdock | 210/DIG. 5 |
| 4,591,441 | 5/1986 | Sakai | 210/DIG. 5 |
| 5,417,848 | 5/1995 | Ermannsdörfer et al. | 210/DIG. 5 |
| 5,468,385 | 11/1995 | Inoue | 210/540 |

*Primary Examiner*—Christopher Upton
*Attorney, Agent, or Firm*—Leon D. Rosen

[57] ABSTRACT

A system is described for separating first and second liquids that are present in an intimate mixture consisting primarily of the first liquid, which enables recovery of a high proportion of the second liquid in a system of moderate cost for construction and operation. The system includes a screen formed of a single woven pattern of metal threads that have been woven in a uniform pattern, and that are backed by back-ups having holes larger than those of the screen. The mixture is pumped through the screen, causing the microscopic droplets of the second liquid to coalesce into much larger drops, so the drops can be rapidly recovered. The screen is very fine, with a thread count of at least 500 per inch (20 per millimeter), and the liquid is passed very slowly through the screen, at a velocity of no more than 12 inches per minute (30 cm./min.), to recover at least 70% and preferably at least 75% of the second liquid.

2 Claims, 3 Drawing Sheets

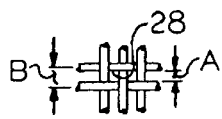
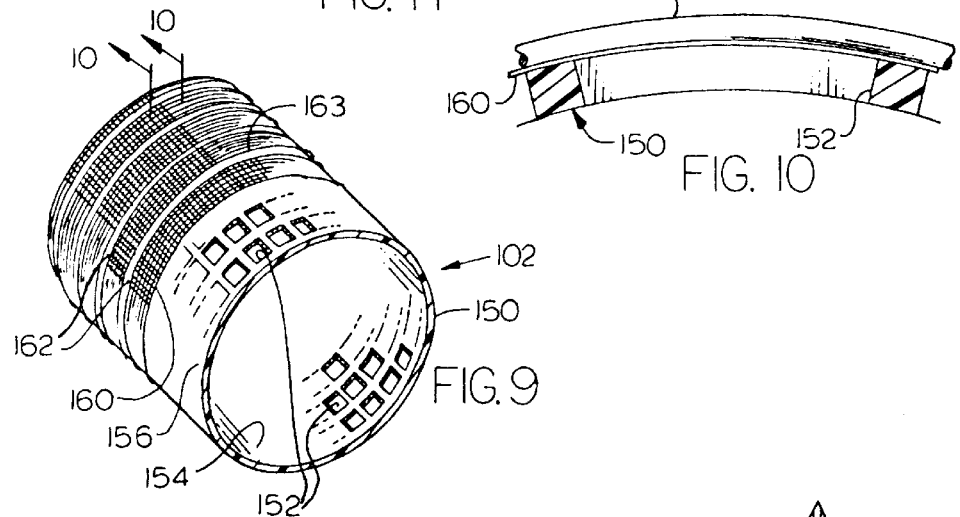
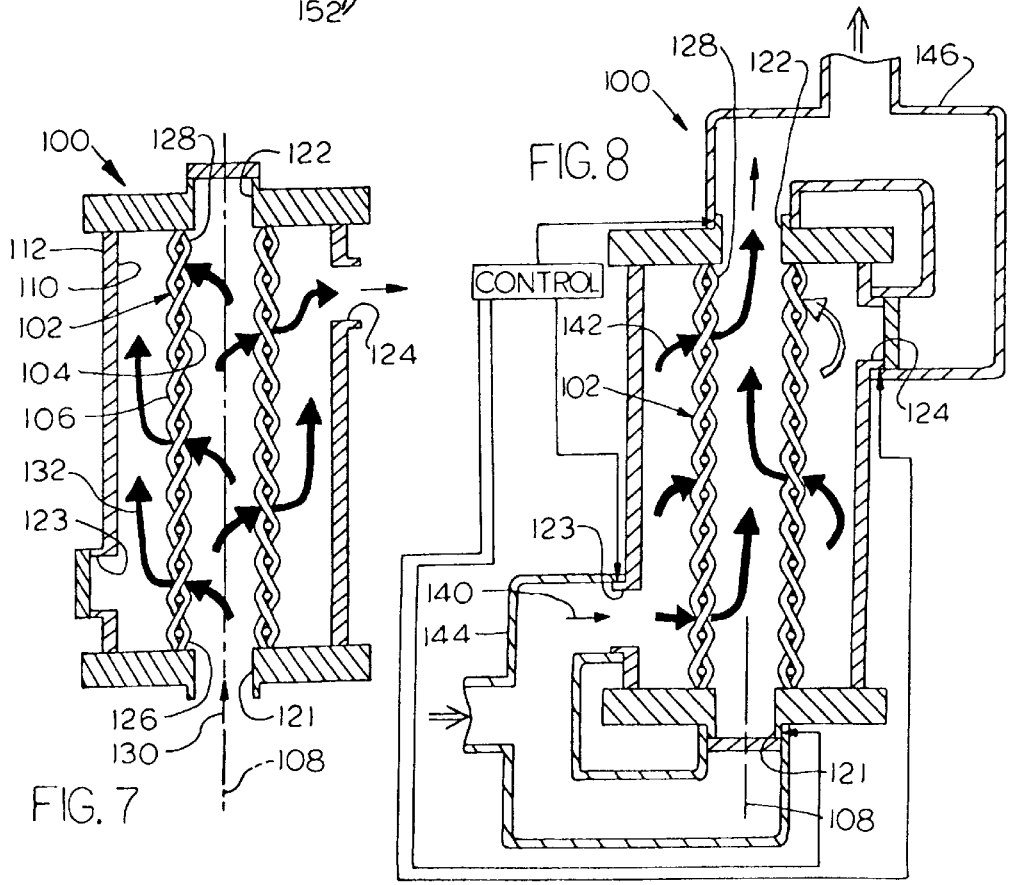

ENHANCED LIQUID MIXTURE SEPARATION SYSTEM

CROSS-REFERENCE TO RELATED CASE

This application is a continuation-in-part of Ser. No. 08/790,373 filed Jan. 28, 1997, which claimed the benefit of U.S. Provisional Application No. 60/010,733 filed Jan. 29, 1996.

BACKGROUND OF THE INVENTION

There are many industrial applications where it is necessary to separate first and second liquids. One application is in separating a small quantity of oil that is intimately mixed with water, so the oil can be recovered for use and the water can be disposed of without violating environmental regulations. A corresponding use is in separating a small amount of water contained in a larger quantity of oil, so the water does not harm machinery that uses the oil. Still another widespread use is in removing light organic components (e.g. kerosene) from an aqueous stream (e.g. water, or electrolyte, or raffinate) as described in U.S. Pat. No. 5,273,654. Larger droplets of the second liquid can be removed by known coalescing devices such as a plate coalescer. However, a high proportion of microscopic droplets, left after coalescing, cannot be removed by such devices.

A high proportion of microscopic droplets of one liquid, such as water mixed into oil, usually can be removed by pumping the mixture through a disposable oil filter. However, it is expensive to use such disposable filter where a large quantity of the second liquid must be removed. Perhaps 90% of microscopic droplets would eventually coalesce and rise to the surface of a settling tank, after a period of time of a few days to a few months (assuming the mixture was not disturbed), but this period is too long for most applications. It is noted that fine steel wool, batt (continuous sheet of fiber), and sintered metal can serve as filters, but they have long zig-zag passages that clog and that are not readily cleaned by reverse flow. Such devices can be cleaned of oil and a small amount of solid particles by flowing a light hydrocarbon such as kerosene that dissolve them, but this results in the problem of how to environmentally dispose of the kerosene. A system for use in removing a high percentage of microscopic droplets of a second liquid contained in an intimate mixture with a first liquid, such as oil from water, water from oil, or organics from an aqueous stream, which was of moderate cost to construct and operate, would be of value.

SUMMARY OF THE INVENTION

In accordance with one embodiment of the present invention, a system is provided for use with an intimate mixture of first and second liquids, which coalesces microscopic droplets of the second liquid by passing the mixture through a screen, so the coalesced drops of the second liquid can be readily removed by conventional devices, which is of moderate cost and which is effective. The screen is formed of a single woven pattern of threads that have been woven in a uniform pattern. The threads are preferably of a material that is wetted by the second liquid. The screen has very closely spaced threads so the screen retains fine particles such as those having a diameter no more than 25 microns. A single layer of screen is established, with a backup having much larger holes (preferably at least four times the area of the screen pores). The screen is preferably of electrically conductive material such as metal, to discharge free charges of microscopic droplets of the liquid. The mixture is pumped through the screen at a very low velocity such as no more than thirty centimeters per minute (twelve inches per minute). Applicant finds that by thus slowly moving the liquid through the very fine screen, that the microscopic droplets of the second liquid are coalesced by the screen into larger droplets that can be readily separated as by a conventional plate coalescer.

Flow through the woven screen is reversed at intervals, with the liquids passing through the screen being delivered to a coalescer for either direction of movement through the screen. Thus, the reversal is not a backwash. The single layer fine screen allows such rapid reversal. The fine screen can be wrapped around a rigid tube that has numerous holes, with a resilient holder wrapped around the screen to hold it in intimate contact with the outside of the tube.

The novel features of the invention are set forth with particularity in the appended claims. The invention will be best understood from the following description when read in conjunction with the accompanying drawings.

BRIEF DESCRIPTION OF THE DRAWINGS

FIG. 7 is a simplified sectional side view of a system constructed in accordance with another embodiment of the invention, shown in a first condition wherein a mixture moves radially outwardly through the walls of a tubular screen.

FIG. 8 is a view similar to that of FIG. 7, showing the system in an alternate configuration wherein fluid moves radially inwardly through the tubular screen, and also showing an additional portion of the system.

FIG. 9 is a partial isometric sectional view of the tubular screen of FIGS. 7 and 8.

FIG. 10 is a view taken on line 10—10 of FIG. 9.

FIG. 11 is an enlarged plan view of a portion of a screen of a plain weave construction.

DESCRIPTION OF THE PREFERRED EMBODIMENTS

Figure 1:
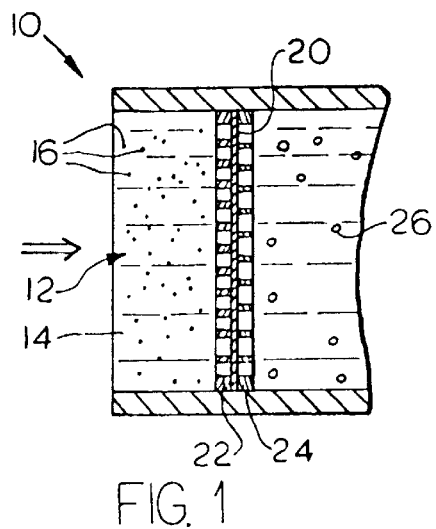
FIG. 1 is a simplified sectional view of a separation system constructed in accordance with one embodiment of the present invention.

FIG. 1 illustrates a separation system 10 for separating components of an intimate mixture 12 of liquid components, including a first liquid 14 (e.g. water) constituting most of the volume of the mixture, and with a second liquid (e.g. oil) present in the form of microscopic droplets 16. The system includes a screen 20 backed by backup plates 22, 24 having much larger holes 25 (more than four times the area of the screen pores, and preferably more than ten times) than the pores in the screen. As the mixture passes through the screen, the screen causes the microscopic droplets 16 to coalesce and form much larger drops 26 of the second liquid. The larger drops can be removed from the first liquid 14 as by a plate coalescer, a settling tank, etc. It is noted that before the mixture is pumped through the screen, larger droplets and most solid particles already have been removed. This method for coalescing microscopic droplets into larger drops that can be more easily coalesced for removal, has been known. However, prior systems resulted in coalescing and consequent removal or recovery, of only a moderate percentage of the microscopic droplets of the second liquid.

Figure 4:
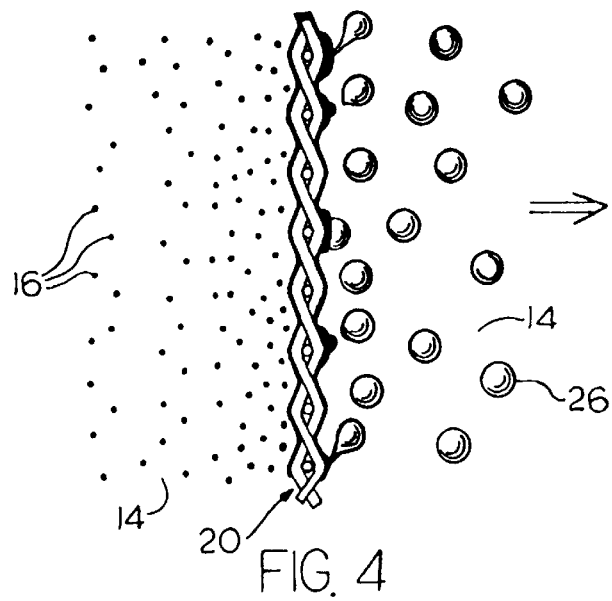
FIG. 4 is a greatly enlarged sectional view of a portion of the screen of FIG. 1, showing the manner in which the screen coalesces microscopic droplets of a second liquid that is contained in a first liquid.

In accordance with the present invention, applicant uses a very fine woven screen 20 and passes the mixture at a very low velocity through the screen. The screen comprises threads that have been woven in a uniform pattern. The screen preferably includes a single layer of such uniformly woven threads with microscopic (less than 0.01 inch wide) pores. The screen 20 of FIG. 4 is considered a single screen because all threads are intimately woven into each other. Most screens useful in this invention only have two largely perpendicular rows of threads, with substantially all screens having no more than four intimately woven threads. The backup 22 or 24 has holes 25 that are more than four times as large in area and preferably more than ten times as large in area. A screen assembly with multiple facewise adjacent screens would result in zig-zag passages that are likely to become clogged by the second liquid and particles, with the clogging not eliminated by a simple reverse flow of the mixture. A quantity of unwoven fibers held in a layer that is many fibers thick, would be even worse. The uniformly woven screen is preferably formed of threads of metal, such as stainless steel of microscopic (less than 0.01 inch width) thickness. Metals are electrically conductive, so they can discharge free static electricity charges in microscopic oil droplets, to avoid repulsion and promote droplet coalescing. Also, engineering metals are typically more than ten times as strong as engineering plastics. For example, the Young's Modulus of Polyesters and Nylons are about $0.4 \times 10^6$ psi compared to $30 \times 10^6$ for steel, about $15 \times 10^6$ for copper alloys, and about $9 \times 10^6$ for aluminum alloys. All engineering metals have a Young's Modulus of more than $10^6$ psi.

Figure 5:
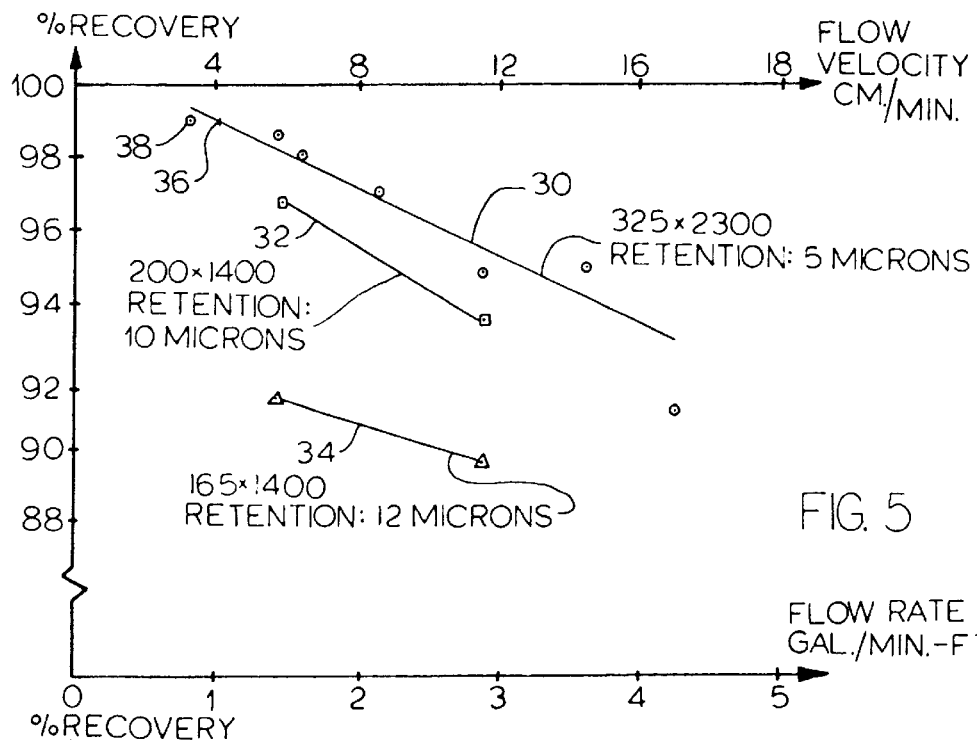
FIG. 5 contains graphs showing the percent recovery versus flow rate for the flow of a mixture of oil (hydrocarbon) in water, for flow through screens of different constructions.

FIG. 5 shows the results of tests that applicant has conducted in the removal of oil (hydrocarbons) resulting from the flow of produced water, wherein the mixture pumped through the screens contained 560 milligrams of oil per liter of mixture, or in other words 560ppm (parts per million) of oil. It is noted that produced water often includes a substance in solution with the water such as a small amount of dissolved oil components. In FIG. 5, the vertical axis shows the percent recovery of the oil, which is the percent of oil recovered after the coalesced drops produced by the screen were coalesced by a screen coalescer. The horizontal axes include a lower one showing flow rate in gallons (each gallon comprises 231 cubic inches) per minute, per square foot of screen. The upper horizontal axis shows the flow velocity in centimeters per minute.

In FIG. 5, graph 30 shows the characteristics for a fine screen, with stainless steel wires or threads present in a thread count of 325 strands per inch in the warp direction and 2300 strands per inch in the weave direction, the particular screen having a twilled dutch weave and supplied by Tylinter of Mentor, Ohio. This screen is specified to have a retention of five microns, which means that a flow of air with fine particles results in the screen blocking particles having a width of more than five microns. If one assumes that screens are constructed as shown in FIG. 11, where the width A of each pore 28 is one-half of the thread spacing or one-half the inverse of the thread count, then with a thread count of 2300 per inch (0.0004 inch or 11 microns center-to-center thread spacing) can be said to provide pores having a width A of 0.00022 inch, or five microns. Although the actual retention depends upon the weave, the thread count provides a good approximation of the retention (the retention is roughly one-half the center-to-center distance of the threads).

Graph 30 in FIG. 5 shows that for the 325×2300 screen, the percent recovery increased as the flow velocity through the screen decreased. That is, the percent recovery approached 100% for a flow velocity of less than 4 cm./min. and decreased to about 93% for a flow velocity of about 17 cm./min. The graph 30 indicates that the recovery progressively decreases with increasing flow velocity, that a flow velocity of no more than about 12 cm./min. should be maintained in order to obtain a recovery of at least 95%, and that a flow velocity below about 18 or 20 cm./min. should be maintained for a recovery of at least 90%. A linear extension of graph 30 indicates that a recovery of above 80% can be maintained for a flow velocity of up to 30 cm./min.

Graph 32 shows the characteristics for a 200×1400 stainless steel screen (twilled dutch weave), having a specified retention of ten microns. It is noted that in FIG. 11, a thread count of 1400 indicates a thread spacing B of 17.5 microns and a pore width A (or retention) of nine microns, which is close to the actual retention of ten microns. This larger screen 32 resulted in a decreased recovery for the same flow velocity, as compared to screen 30. However, the recovery was over 93% for a flow velocity of no more than 12 cm./min., and indicates a recovery of over 90% for a flow velocity of under 18 cm./min. FIG. 5 shows a graph 34 for another screen with stainless steel threads having a count of 165×1400 (twilled dutch weave), and with the screen having a stated retention of twelve microns. The recovery was lower for the screen of graph 34, but was still above 90% for a flow velocity of no more than about 12 cm./min. It is noted that for the screen of graph 34, the nominal pore size is 9 microns, although the measured retention is 12 microns.

The graphs of FIG. 5 indicate that a high recovery of over 90% can be obtained by pumping an oil-water mixture through a fine screen where the thread count is at least 1400 per inch (55 per millimeter), and by flowing the mixture at a velocity of no more than about 12 cm./min. The above also indicates that it is preferred that the retention of the screen be no more than about twelve microns. It is noted that a recovery of 95% results in the oil content of 560ppm being reduced to 28ppm, while a recovery of 99% (shown at point 36 on graph 30, for a flow velocity of about 4 cm./min.) results in only about 6ppm of oil in water. In actual tests, the point 38 resulted in a reduction from 560ppm to 7ppm. The graph indicates that over 80% recovery can be obtained by a flow rate of up to 30 cm./min. through a screen of retention of 5 microns, and by a flow rate of up to 26 cm./min. for screens of 10 or 12 microns retention.

Figure 6:
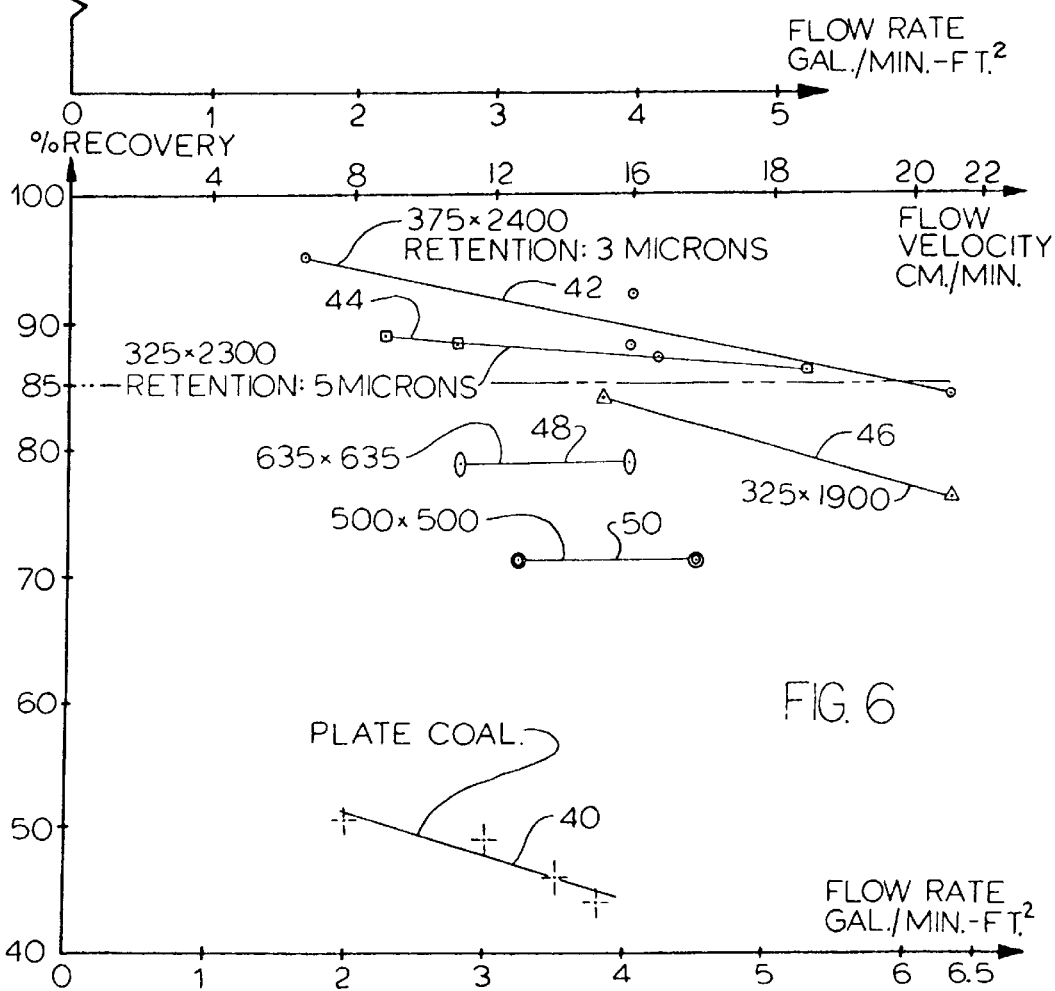
FIG. 6 contains graphs showing the percent recovery versus flow rate for the flow of a mixture of kerosene in a water-diluted acid, for flow through screens of different constructions.

FIG. 6 contains graphs showing the percent recovery of a light organic, specifically kerosene, from an electrolyte stream comprising 2% sulfuric acid and 0.5% copper sulfate in water, with 130ppm of kerosene (0.8 centipoise at room temperature) present after initial large drop removal. Light organics can be defined as those having a viscosity on the same order of magnitude as water (1 centipoise) at room temperature (22° C.), or a viscosity of no more than 10 centipoise. The removal of organics from such an aqueous stream (which has a viscosity of no more than 10 centipoise) is important in solvent extraction mining, or heap leaching, especially in copper mining, as described in U.S. Pat. No. 5,273,654. Previously, plate coalescing alone has been used, which resulted in a recovery of kerosene of no more than about 50%. A recovery which left only half as much, which would be a recovery of at least 70% or 75%, would be of great benefit. It may be noted that the mixture of organic in an aqueous stream may contain other components that raise the viscosity to much more than 10 centipoise.

Graph 40 in FIG. 6 shows recovery by a plate coalescer, where the mixture moves at a very low velocity through the coalescer. Graph 42 shows the recovery for a 375×2400 stainless steel screen that has a stated retention of three microns. It is noted that a thread count of 2400 would result in a pore width about five microns for the weave of FIG. 11, although a wide variety of weaves are available that affect the retention. The recovery of kerosene from an aqueous liquid is at least 95% for a flow velocity of no more than about 8 cm./min, and was measured to be about 85% for flow rates of up to 21 cm./min. The graph 42 indicates a recovery of over 70% for a flow rate of up to 30 cm./min. Graph 44 shows the recovery characteristics for a screen having a thread count of 325×2300 and a stated retention of five microns. Although the recovery is not as good as for the screen of graph 42, the recovery for graph 44 is still above 85% for a flow velocity of up to 18 to 20 cm./min, and above 75% for all tested flow rates (up to 21 cm./min.).

Graph 46 shows the recovery of kerosene using a screen having a thread count of 325×1900 (twilled dutch weave) and a stated retention of 5 microns. The recovery was somewhat less than for graphs 42 and 44, but was still above 75% for flow velocities of up to 21 cm./min. Graph 48 shows recovery for a screen having a thread count of 635×635 (twill square weave), a stated opening size of 20 microns, and an indicated retention of 20 microns (per FIG. 11). This screen did not perform as well as those of graphs 42, 44, and 46, in that applicant obtained a recovery of about 79% for flow velocities of 11 to 16 cm./min. The graphs 42, 44, 46 and 48 all indicate a recovery of over 75% for a flow rate of up to 20 cm./min.

Another screen with coarser threads was tested, with graph 50 representing the results for a screen thread count of 500×500 (twill square weave), and a stated opening size of 25 microns. This indicates that when the largest thread count is at least 500 to the inch, a recovery of at least 70% can be obtained for a flow rate of up to 17 cm./min. This is far superior to that obtained with a plate coalescer.

Applicant has used the 375×2400 stainless steel screen to separate out a small amount of water mixed into an organic solvent used in copper leaching. The organic solvent included kerosene and an extractant which was type L1X984 sold by Henkel Corporation. The water constituted 300 to 800ppm of the mixture. In test flow rates of up to 7 cm./min., no trace water was found in the outlet fluid.

Figure 2:
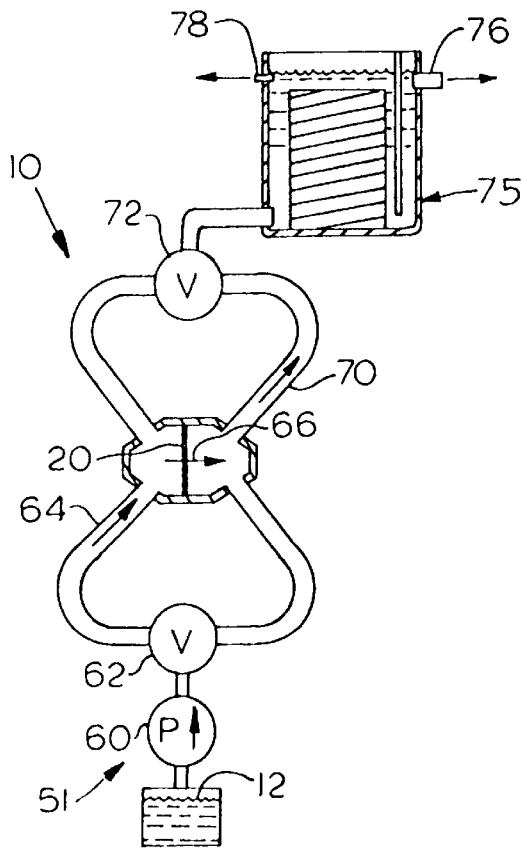
FIG. 2 is a simplified view of the system that includes the portion of FIG. 1, shown during flow of the mixture in a first direction through the screen.
Figure 3:
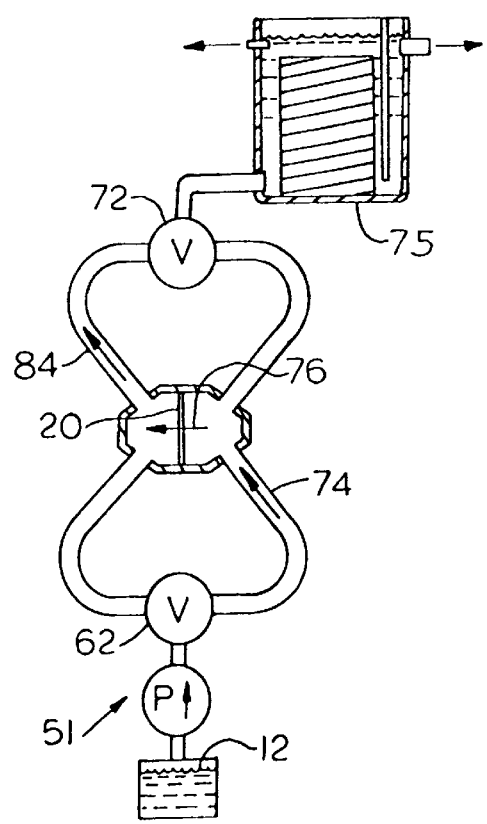
FIG. 3 is a view similar to that of FIG. 2, but shown during flow of the mixture in a second direction through the screen.

FIGS. 2 and 3 are simplified views of a system that includes the screen 20 and a fluid directing arrangement 51 that includes a pump device 60, valves 62, 72, and conduits 64, 70, 74, 84. The system uses the screen 20 to coalesce microscopic droplets contained in an intimate mixture 12 of the droplets of second liquid in primarily a first liquid. The mixture 12 is pumped through the pump device 60 (a pump, pressure by gravity, etc.) and through valve 62. Initially, the valve directs flow along first conduit 64 so the fluid passes in a first direction 66 through the screen 20. The liquid then passes through outlet conduit 70 and through valve 72, which directs the flow into a coalescer that can rapidly coalesce larger drops, such as a plate coalescer 75. The first liquid such as water emerges through a first outlet 76 of the coalescer, while the second liquid such as oil emerges through a second outlet 78 of the plate coalescer.

After a period of operation (e.g. less than one hour) of the system 10 of FIG. 2, the screen 20 becomes clogged with particles (other than the first and second liquids). In that case, applicant reverses flow, by operating the system as shown in FIG. 3. In FIG. 3 the valves 62 and 72 are switched so fluid moves through a second outlet conduit 74, in a second direction 76 through the screen, and through conduit 84 and valve 72 to the coalescer 74. Applicant maintains a pressure drop across the screen of about 70 kPa, and switches the valves when the pressure difference across the screen has increased by about one-half.

In FIGS. 2 and 3 the flow is horizontal through the screen 20 and is upward or at an upward incline which may be vertical along both outlet conduits 70, 84 that carry away fluid that has passed through the screen. The coalesced drops of oil in water tend to rise, and if the flow were at a downward incline the coalesced drops would rise to the top of the conduit, and form a quantity that must be separately removed. The same generally upward incline, without pockets where oil can accumulate, is shown in FIG. 8. If the drops are of a liquid that is more dense than the surrounding liquid, then the outlet conduits should extend at a downward incline from the screen.

FIG. 7 shows another system 100 that applicant has constructed, which was found to be especially useful in carrying out the process of the present invention. A screen 102 (single layer woven metal screen) of the characteristics described above, is in the form of a tube having an inside 104, an outside 106, and an axis 108. The screen lies within a chamber 110 of a container 112. The chamber has four ports 121, 122, 123, and 124, with open-close valves at each port. The inside 104 of the tubular screen is connected at one end 126 to the first port, and is connected at its opposite end 128 to the second port. The third and forth ports 123, 124 are connected to the outside 106 of the screen, at the walls of the chamber. Initially a mixture to be separated is pumped into the first port 121 as indicated by arrow 130. The mixture moves in the paths indicated by arrows 132 wherein the mixture moves radially outwardly through the screen tube (the radial direction is with respect to the tube axis 108). The mixture then moves out through the fourth port 124.

After a while, the screen tube 102 becomes clogged, as with microscopic solid particles. When this occurs, the direction of flow is reversed, so it is as shown in FIG. 8. In FIG. 8 the mixture enters the chamber along the path 140 to flow into the third port 123. The fluid then moves along the paths 142 in a radially inward direction through the screen tube 102, and out through the tube end 128 and second chamber port 122. FIG. 8 shows additional fluid conduits including an inlet conduit 144 where fluid can flow into either of the ports 121, 123, and an outlet conduit 146 that carries fluid that has passed through either of the outlet ports 122, 124.

FIG. 9 shows the construction of the tube screen 102. The tube screen includes a substantially rigid support tube 150 which has numerous through holes 152 between its primarily cylindrical tube inner surface 154 and its tube outer surface 156. A single layer of woven metal screen 160 of the construction described above for FIGS. 5 and 6, is wrapped around the support tube 150, with opposite sides of the screen sealed together, as by overlapping them (and possibly using adhesive thereat). A holder 162 presses the screen 160 against the outer surface of the support tube 150. One example of a holder 162 is a wire that is wrapped in a helical path around the screen 160 and that forms gaps or holes 163 between adjacent turns. Such wire 162 is preferably resilient, as by constructing it out of plastic which has a Young's Modulus of Elasticity of less than 300,000 psi and preferably less than 100,000 psi. Another example is a tube of thin elastic material (e.g. in the shape of a Chinese finger-gripping tube toy) that is expanded to fit around the screen 160, and that then compresses itself and compresses the screen against the support tube. Still another example is a shrink tube with numerous holes, which is heat shrunk around the screen 160. In all of these cases, the screen 160 with a thread count of at least 600 in one direction (nominal pore width of no more than 0.0008 inch, or 0.02 mm) is supported on its inside and outside by more rugged material which has large holes that each have a width of at least 1 mm. FIG. 10 shows that the screen 160 is sandwiched between the support tube 150 and the holder 162. It is noted that this construction has been used to hold membranes (but with flow in only one direction allowed for a membrane).

Thus, the invention provides an apparatus and method for coalescing microscopic droplets of a second liquid that is contained in a first liquid, which provides high recovery of at least 75% in a system of simple construction and operation. The system is useful in coalescing microscopic droplets of oil in water or water in oil, and microscopic droplets of an organic material such as kerosene in a aqueous solution such as a water-diluted acid. The mixture is passed through a single layer of a very fine woven metal screen, where the thread count in one direction is at least five hundred per inch and the flow velocity is no more than about 30 cm./min. A fine screen has relatively narrow pores, and clogging can be avoided by reversing the direction of flow through the screen, such as when the pressure drop increases by one-half from an initial pressure difference across the screen. The system is useful in many situations, including purification of produced water in an oil field to below 27ppm which is a preferred level for environmental disposal, removal of oil from water, recovery of kerosene from solvent extraction fluid (usually including acid in primarily water) and dehydration of oils and organics (e.g. kerosene).

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for treating a mixture of liquids that comprise oil and water to separate them, comprising:

flowing said mixture through a single layer woven screen that is woven of primarily metal threads and that has a thread count on the order of magnitude of at least 1400 per inch in one count direction, and at velocity of no more than about 12 centimeters per minute to produce drops of a first of said liquids in said second liquid in a flow path that is primarily perpendicular to the woven screen;

passing said mixture after it has flowed through said screen, into a coalescer separator to separate said liquids;

said mixture comprises primarily water and said step of passing said mixture after it has flowed comprises passing said mixture at a generally upward incline to said coalescer separator.

2. A method for treating a mixture of liquids that includes an aqueous solution having a viscosity of no more than 10 centipoise at 22° C., in an organic liquid having a viscosity of no more than 10 centipoise at 22° C., comprising:

flowing said mixture through a woven screen that is woven of primarily metal threads and that has a thread count on the order of magnitude of at least 1400 per inch in one thread count direction, and at velocity of no more than about 12 centimeters per minute to produce drops of a first of said liquids in said second liquid;

passing said mixture, after it has flowed through said screen, into a coalescer separator to separate said liquids;

said mixture comprises primarily said organic liquid and said aqueous solution has a higher density than said organic liquid, and said step of passing includes passing said liquid after it has flowed through said screen, at a generally downward incline to said coalescer separator.

* * * * *